Nov. 4, 1924.

L. SCHEINESOHN 1,513,788

AUTOMOBILE BUMPER

Filed April 3, 1924

INVENTOR

Leo Scheinesohn

Patented Nov. 4, 1924.

1,513,788

UNITED STATES PATENT OFFICE.

LEO SCHEINESOHN, OF CINCINNATI, OHIO.

AUTOMOBILE BUMPER.

Application filed April 3, 1924. Serial No. 704,081.

*To all whom it may concern:*

Be it known that I, LEO SCHEINESOHN, a citizen of the United States, residing at Cincinnati, in the county of Hamilton and State of Ohio, have invented new and useful Improvements in an Automobile Bumper, of which the following is a specification.

In the usual automobile bumper construction the bumper element or bar extends transversely of the chassis of the car and is supported somewhat beyond the front or rear or both ends of the car, being supported in this position by arms which are secured to the extending ends of the automobile frame. This common type of bumper construction has disadvantages, among which may be mentioned the additional weight which is placed at the position with relation to the center of gravity of a properly designed vehicle, so that an unbalancing effect is produced and also so that certain destructive vibrations are set up in the parts of the bumper construction and in the portions of the frame to which the bumper is attached. An additional disadvantage of the usual bumper construction lies in the presence of the bar extending across the space between the side members of the frame, thus obstructing access to spare tires, trunk racks and compartments, at the rear of the car as well as obstructing access to the radiator and starting crank at the front of the car.

The real object of any bumper construction is to protect the more easily damaged parts of a motor vehicle from collision occasioned by the projecting portions of a vehicle with which it may collide. Mud guards, lamps, and other more or less easily damaged portions of an automobile extending beyond the body and because they are located on opposite sides of the vehicle and for this reason require protection more than any other parts, I have devised an improved bumper construction which has as an object to produce a bumper which is located in a position to protect such easily damaged parts and which, although strong and rigid, has been made light and is easily attached without requiring the services of a person skilled in such work.

A further object has been to produce a bumper construction which is easily manufactured, which requires less material than other bumper constructions known to me and in which the cost of production has been materially reduced.

These and other objects are attained in the bumper construction described in the following specification and illustrated in the accompanying drawing in which.

Figure 1:
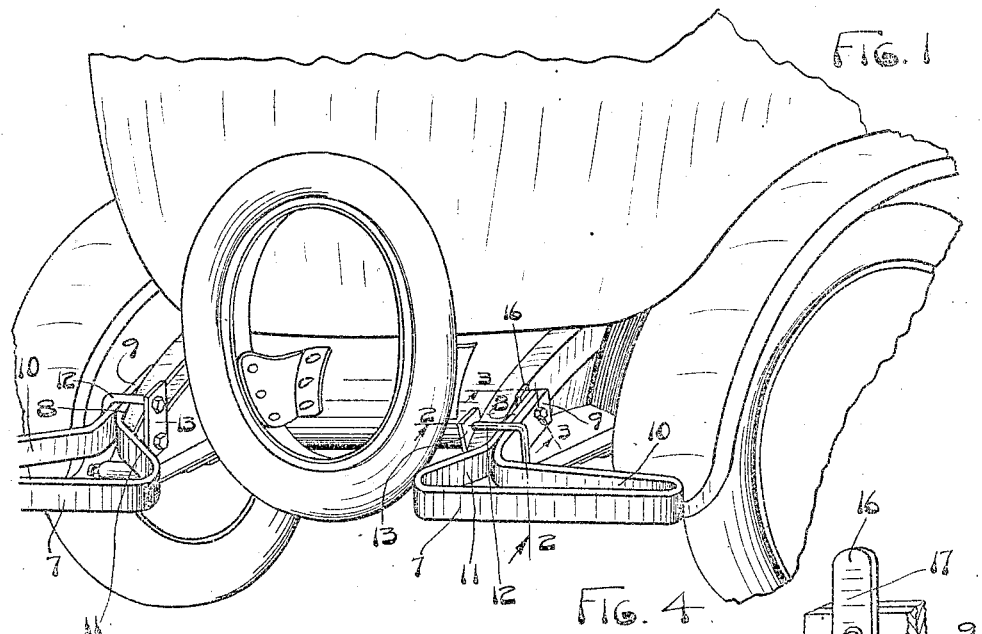
Fig. 1 is a fragmental perspective view of the rear end of an automobile having bumpers embodying my invention attached thereto.
Figure 2:
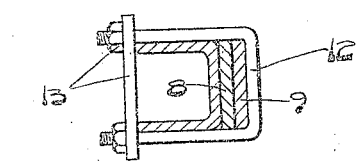
Fig. 2 is a somewhat enlarged sectional view taken on the line 2—2 of Fig. 1.
Figure 4:
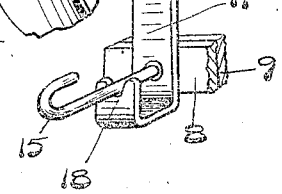
Fig. 4 is a fragmental perspective view of certain of the elements disclosed in Fig. 3.
Figure 3:
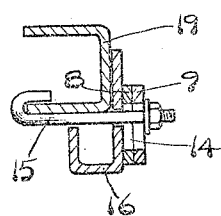
Fig. 3 is a view similar to Fig. 2 and taken on the line 3—3 of Fig. 1.
Figure 5:
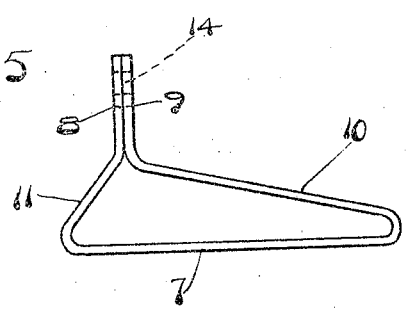
Figs. 5 and 6 are respectively plan and side elevational views of the bumper element or bar of my improved construction.
Figure 6:
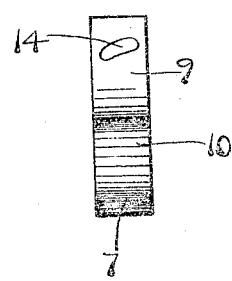

I have designed my improved bumper so that it consists of units which are of right and left hand construction, as shown in Fig. 1. Each of these units consist of a bumper bar 7 having loop formation and having arms 8 and 9 which are designed to be attached to the extending ends of the vehicle frame. The bumper bar 7 is so shaped that the arms 8 and 9 are located somewhat to one side of the center of the loop formed by the arms. This is clearly shown in Figs. 1 and 5 and discloses the fact that a longer portion 10 of the bar extends to the outer side of the vehicle and protects the mud guard while a shorter portion 11 extends toward the inside and protects the bumper mounting clips and spring shackles. Between the bumpers located at the rear of the vehicle the usual tire rack and spare tire mounted thereon will afford ample protection. At the front of the vehicle there need be no protection between the bumpers, because the radiator of the standard automobile is located sufficiently back of the chassis to avoid becoming damaged. In order to secure the bumper bar in position on the vehicle frame I have provided a U shaped clip 12 which embraces the frame and arms 8 and 9 as shown in Figs. 1 and 2 and which is secured thereto by means of a plate and nuts 13. In addition to this fastening device I have provided slots 14 in the arms 8 and 9 for the reception of the end of a hook shaped bolt 15 which engages the channel iron member of the frame as shown in Fig. 3. Cooperating with this bolt I have provided a bracket 16 which is mounted upon the bolt by passing through a branch 17 of the bracket and by having the bolt rest in a notch forming a supporting fork 18 at the other end of the bracket. The bracket 16 is thus designed so that its branch 17 will engage the outside surface of the channel member 19 and so that the ends of the fork will engage the under surface of the channel member as shown in Fig. 3, the outer face of branch 17 affording a bearing surface against which the arms 8 and 9 are clamped when the nut on bolt 15 is tightened. Because of the varying curvature of the ends of the frame members of the motor vehicle chassis, the slots 14 have been located in the arms 8 and 9 in somewhat of an inclined position so that the bumper bars may be adjusted to lie perfectly horizontal in order to receive any blow from collision without becoming displaced or bent.

Having thus described my invention what I claim is:—

An automobile bumper bar having its ends brought together to form a projecting arm, and a clip adapted to attach the arm to a projecting channel iron member of the automobile chassis, said arm having an adjustment slot in its end, said clip consisting of a bracket of substantial U shape having one leg longer than the other, the longer of said legs being adapted to have its side supported by one side of the channel member with the end of the shorter leg abutting an adjacent side of the member, said longer leg having an aperture therein in alignment with the side engaged by the shorter leg, said shorter leg having a notch in the end thereof and in alignment with the aperture of the longer leg, and a hooked bolt located in hooked engagement with the flange of the channel engaged by the shorter leg, passing through the notch of the shorter leg, the aperture of the longer leg, and the slot of the arm, adapted to secure the bar to the channel in adjusted positions.

In witness whereof, I affix my signature in the presence of two witnesses.

LEO SCHEINESOHN.

Witnesses:
 FRED. WOLTHARD,
 SIGMUND KESSER.